United States Patent [19]

Knudson et al.

[11] Patent Number: 4,494,919

[45] Date of Patent: Jan. 22, 1985

[54] APPARATUS FOR LAYING A MAT OF WOOD STRANDS

[75] Inventors: Robert M. Knudson; Hubert Ehrenfellner, both of British Columbia, Canada

[73] Assignee: MacMillan Bloedel Limited, Vancouver, Canada

[21] Appl. No.: 420,084

[22] Filed: Sep. 20, 1982

[51] Int. Cl.³ .......................... B29J 5/00; B29C 23/00

[52] U.S. Cl. ...................................... 425/83.1; 19/296; 198/382; 425/224; 425/449; 425/456

[58] Field of Search ................. 19/93, 296, 305, 80 R; 425/80.1, 81.1, 83.1, 449, 447, 456, 224; 264/108, 109, 113, 121; 156/62.2, 62.4; 198/382, 383

[56] References Cited

U.S. PATENT DOCUMENTS

| | | | |
|---|---|---|---|
| 2,509,823 | 5/1940 | Hughes | 19/93 |
| 2,635,301 | 9/1948 | Schubert et al. | 425/83.1 |
| 3,040,801 | 6/1962 | Hughes | 425/80.1 |
| 3,071,821 | 1/1963 | Constantine et al. | 19/93 |
| 3,115,431 | 9/1959 | Stokes et al. | 264/113 |
| 3,332,114 | 7/1967 | Oja | 19/305 |
| 3,478,861 | 7/1967 | Elmendorf | 198/383 |
| 3,807,931 | 4/1974 | Wood et al. | 425/449 |
| 3,997,942 | 12/1976 | Buck et al. | 19/296 |
| 4,057,876 | 11/1977 | Sawyer | 19/80 R |
| 4,063,858 | 12/1977 | Axer et al. | 264/113 |

FOREIGN PATENT DOCUMENTS

| | | | |
|---|---|---|---|
| 578282 | 6/1959 | Canada . | |
| 597941 | 5/1960 | Canada . | |
| 929179 | 6/1973 | Canada . | |
| 816285 | 7/1959 | United Kingdom . | |
| 988977 | 4/1965 | United Kingdom | 19/80 R |

OTHER PUBLICATIONS

Maloney, Modern Particleboard and Fibreboard, Miller–Freeman Pub., (1977), pp. 490–493.

*Primary Examiner*—Willard E. Hoag

*Attorney, Agent, or Firm*—Banner, Birch, McKie & Beckett

[57] ABSTRACT

An apparatus for laying a mat of wood strands, particularly long strands, in the process of producing a composite product such as waferboard is disclosed. In the past it has not been possible to lay long wafers in an oriented mat except by hand. The present invention provides a means for forming a pile of wood strands of substantially uniform depth, a plurality of spike rolls located at one side of the pile of wood strands to pull the wood strands out of the pile and form a uniform curtain of falling strands and a conveyor to force the pile of wood strands against the spike rolls. Beneath the spike rolls are a pair of counter-rotating spreader rolls spaced apart to receive the curtain of strands and having spikes to distribute the strands in an even mat beneath. A horizontal adjustment is provided to position the spreader rolls beneath the curtain and vary the distance between the rolls.

11 Claims, 4 Drawing Figures

FIG. 3
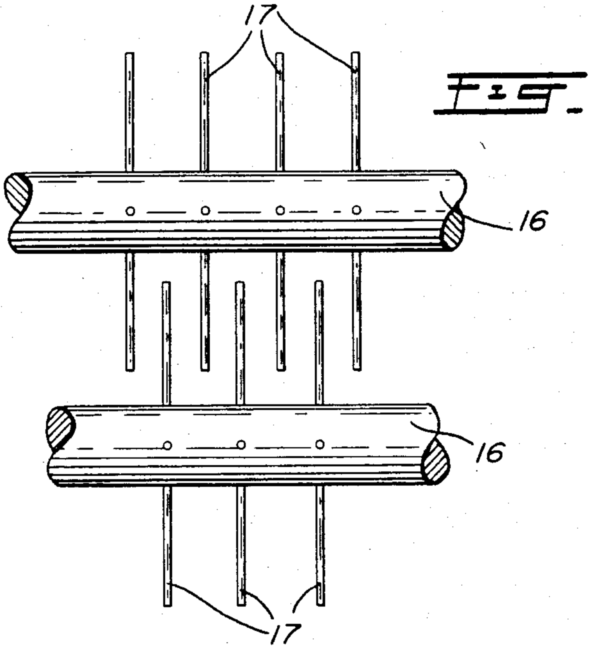
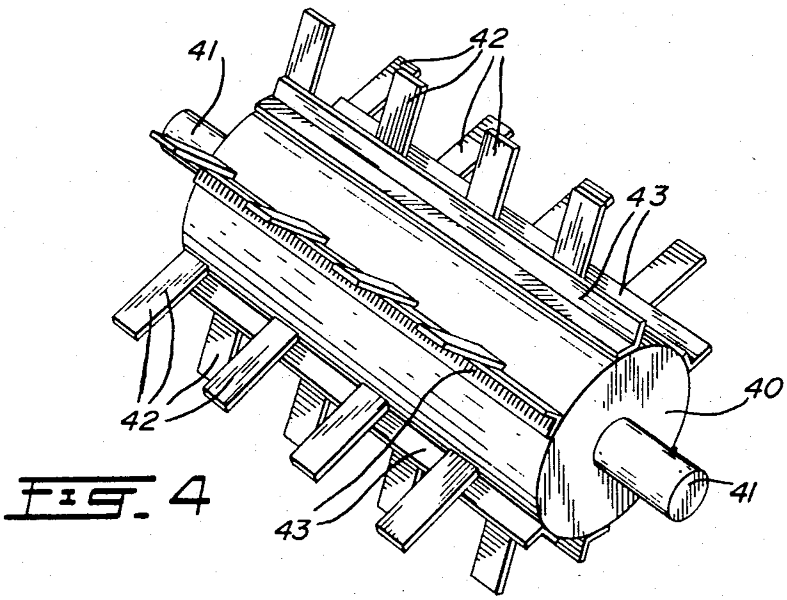
FIG. 4

APPARATUS FOR LAYING A MAT OF WOOD STRANDS

This invention relates to the manufacture of a composite product of wood strands such as waferboard. Most specifically the invention provides an apparatus for laying wood strands in a mat of uniform thickness.

The term "wood strands" includes wood wafers, flakes, particles and chips having a length equal to or greater than the width, and having a thickness not greater than 3 mm (⅛ inch). Wood strands for composite panelboards are generally made in lengths of from 12 mm (½ inch) to 76 mm (3 inch) widths of up to 38 mm (1½ inch) and a thickness not greater than 3 mm.

In the preparation of waferboard, wood wafers are first blended with resin and wax and then laid in a mat of uniform thickness on an advancing conveyor which conveys the mat to a hot press for curing the resin to make a waferboard product. The wafers are generally laid in several layers one on top of the other. In some cases certain layers have the strands oriented. In one case the two outer layers have the strands oriented in the lengthwise direction of the board and the inner layers have the strands randomly oriented. Other types of waferboard have the strands oriented along the length of the board in some layers and across the width of the board in other layers.

At the present time, the maximum length of wafers in the preparation of waferboard has been not greater than 76 mm (3 inch). However, there is consideration today of producing a waferboard with wafer lengths of 305 mm (12 inch) or longer. Such a board has greater strength properties than existing waferboard. Waferboard utilizes more of a tree than plywood and thus is a more efficient use of wood. Furthermore, the weight of waferboard made from long wafers is substantially the same as the weight of a plywood having equivalent strength properties.

Although the application is primarily concerned with waferboard, other types of wood strands may be used with the apparatus of the present invention. The composite product may include external veneer sheets with wood strands in between, the wood strands may be laid in an oriented pattern.

It is the purpose of the present invention to provide an apparatus for laying wood strands up to at least 305 mm in length in a mat of substantially uniform thickness. The wood strands may be laid in an oriented pattern or in a random pattern. The apparatus spreads the wood strands in a uniform manner to provide a mat having substantially even thickness.

The present invention provides an apparatus for continuously laying wood strands in a mat of substantially even thickness, the mat advancing at a substantially constant speed, comprising means for forming a pile of wood strands of substantially uniform depth, a plurality of spike rolls rotating about substantially horizontal, parallell axes spaced vertically apart and located at one side of the pile of wood strands, the spike rolls adapted to pull wood strands out of the pile and form a uniform curtain of falling strands, advancing means for the pile of wood strands to force the pile against the spike rolls, a pair of counter-rotating spreader rolls, side by side in the same horizontal plane, the spreader rolls having axes substantially parallel to the spike roll axes and located beneath the spike rolls to receive the curtain of falling strands, each of the spreader rolls having a plurality of radially extending spikes to distribute the strands evenly in a mat beneath, and horizontal adjustment means for the spreader rolls to adjust the location of the spreader rolls beneath the curtain of falling strands, and provide a predetermined distance between tips of the spikes on one spreader roll and tips of the spikes on the other spreader roll.

In a preferred embodiment the means for forming the pile of wood strands includes a rake back conveyor located at the top of the pile to convey wood strands at the top of the pile away from the spike rolls, and wherein the advancing means includes a conveyor at the bottom of the pile to advance the pile towards the spike rolls. The spike rolls are preferably located between the rake back conveyor at the top of the pile of wood strands and the conveyor at the bottom of the pile, the axes of the spike rolls are in a substantially straight line sloping upwards towards the rake back conveyor. The preferred angle of slope is in the range of about 55 to 60 degrees to the horizontal.

In another embodiment an orienting means is located beneath the spreader rolls and above the mat to provide an orientation of strands in the mat. In one embodiment the spike rolls adjacent to each other have spikes which intermesh and overlap, or alternatively the spikes are in line, and a space is provided between tips of the spikes on one spike roll and tips of the spikes on the adjacent spike roll. The spikes on the spike rolls and on the separating rolls, in one embodiment are formed from flat strips having a rectangular cross-section.

In drawings which illustrate embodiments of the invention

FIG. 1 is a side elevation showing one embodiment of an apparatus for laying a mat of wood strands according to the present invention.

FIGS. 2 and 3 are schematic partial elevations showing different configurations of the arrangement of spikes on adjacent spike rolls.

FIG. 4 is a partial isometric view of a spike roll or a spreader roll having one type of spike.

Figures 1, 2:
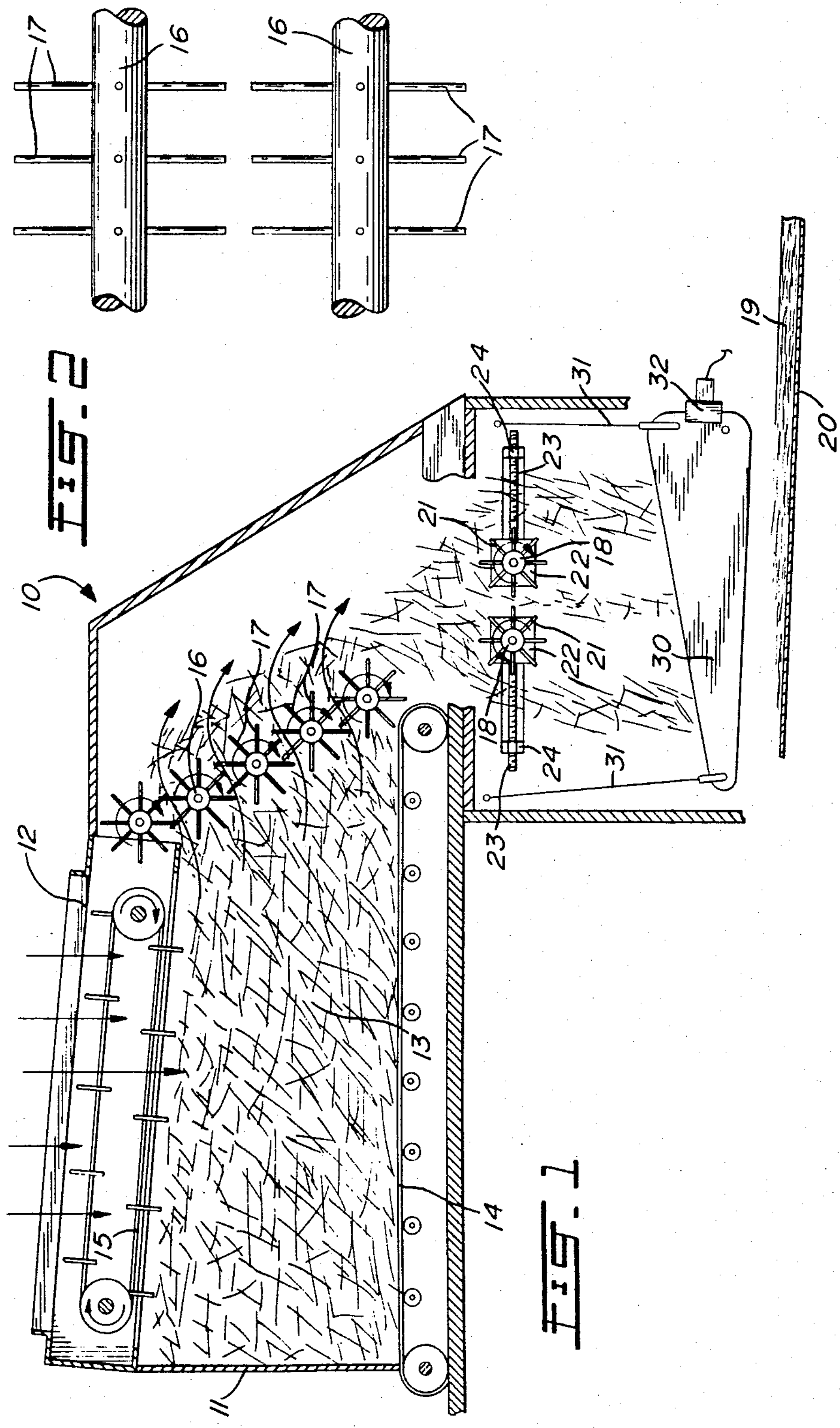

Referring now to the FIG. 1, the forming apparatus 10 has a bin 11 with a top entrance 12. The wood strands pass through the top entrance 12 to form a pile 13 which rests on an apron conveyor belt 14. When the strands enter the bin 11 they pass through a rake back conveyor 15 which rakes the top of the pile 13 backwards in such a manner that the level of the pile is maintained at substantially the same height as it advances on the apron belt 14. The rake back conveyor 15 moves wood strands backwards and the apron belt 14 moves the pile 13 forwards.

At the end of the apron belt 14 and between the apron belt 14 and the rake back conveyor 15 are a plurality of spike rolls 16. The spike rolls 16 have horizontal parallel axes which extend in a substantially straight line sloping backwards towards the rake back conveyor 15. The distance between each spike roll is sufficient so that radial spikes 17 extending radially from the spike roll 16 gently pull the strands out of the pile 13 to meter the flow of strands, and form a uniform curtain of falling strands which drop onto two spreader rolls 18 located side by side in the same horizontal plane, and with axes substantially parallel to the axes of the spike rolls 16. A space is provided between the spreader rolls 18, the space being in the approximate center of the curtain of falling strands. Some strands fall through the space between spreader rolls 18. The two spreader rolls 18 are counter rotating so that the wood strands that fall on the spreader rolls 18 are thrown outward of each roll 18 and fall in a substantially even layer to form a mat 19 resting on a mat conveyor 20. The speed of the apron belt 14 and the rotational speed of the spike rolls 16 can be independently varied to control the flow of strands.

Each of the spreader rolls 18 has a plurality of radially extending spikes 21 to aid in distributing the strands in a mat having an even thickness. As shown in FIG. 1, each of the spreader rolls 18 is mounted on a trunnion block 22 which has a horizontal movement, and a threaded rod 23 and locking nut 24 provide adjustment for each spreader roll so that a predetermined space can be provided between tips of the spikes 21 on one spreader roll 18 and tips of the spikes 21 on the adjacent spreader roll 18. Furthermore, the spreader rolls 18 can be positioned an equal distance apart from the center of the falling curtain of strands. The rotational speed of the spreader rolls 18 can be adjusted to aid in the even distribution of the strands. These adjustments are necessary to take into account different lengths and dimensions of wood strands being formed in a mat. The strands fall onto the mat 19 from both sides of the spreader rolls 18 and through the space between the spreader rolls 18.

In one embodiment, an orienting device is provided so that as the strands fall from the spreader rolls 18, they are oriented either in the longitudinal direction of the moving mat or crosswise across the mat. There are various types of orienting devices suitable for orienting strands. Such devices include rotating discs, vibrating plates and electrostatic orienting systems.

In one particular orienting device, a series of plates 30 are hung vertically by wires or cables 31 in line and spaced across the mat conveyor 20 to form an orienting grid. The spacing of the plates 30 is dependent on the size of the wood strands. The elevation of every other plate 30 is higher than the adjacent plate to avoid the strands bridging across the plates 30 and a vibrating mechanism 32 vibrates the plates 30 as they hang from the strands 31 to ensure that strands do not get hung up on the plates when falling from the spreader rolls 18.

In operation, wood strands drop through the rake back conveyor 15 into the bin 11 resting on the apron belt 14. The height of the pile 13 is determined by rake back conveyor 15 which ensures that the pile is at a substantially even height when advancing to the spike rolls 16. The apron belt 14 always moves slowly so that the pile 13 is pushed against the spike rolls 16, and the spike rolls then gently pull the wood strands from the pile 13 and meter the flow of strands falling in a uniform curtain on and between the spreader rolls 18. The spreader rolls 18 throw the wood strands on either side where, if an orienting device is provided, the strands are oriented and then laid onto a mat 19 on a mat conveyor 20. The mat conveyor 20 is continuously moving and the mat 19 is formed with a substantially uniform or even thickness. FIG. 1 illustrates the mat 19 being laid directly on a conveyor 20. However, if several layers are formed, the mat can be laid directly on a previous mat.

FIG. 2 illustrates two adjacent spike rolls 16 with spikes 17 in line. A space is provided between tips of the spikes 17 on one spike roll 16 and tips of the spikes 17 in the adjacent spike roll 16. FIG. 3 illustrates two adjacent spike rolls 16 with spikes 17 intermeshed so that the spikes 17 on one spike roll 16 overlap the spikes 17 on the adjacent roll. It has been found that for long wafers less breakage occurs in the wafers when the spikes 17 are arranged in line, however a better coefficient of variation in the resulting mat 19 occurs when the spikes 17 are intermeshed. In as much as there is no overlapping of the spikes 22 in the two spreader rolls 18, it does not matter if the spikes in one roll are in line or in between the spikes on the other roll.

One type of roll, either spike roll 16 or spreader roll 18 is shown in FIG. 4 wherein a roll 40, mounted on a shaft 41 has a series of spikes 42 which are formed from flat strips having a rectangular cross-section with the flat face in line with the roll axis. The flat spikes 42 are attached to the face of the roll 40. One method of attaching the spikes 42 to the roll 40 is by angle sections 43 extended axially along the face of the roll. Four, six or eight spikes 42 may extend radially around the roll, spikes may be staggered in radial extensions with four or six spikes 42 in one circumferential plane and the same number in an adjacent plane but offset.

Tests were carried out for forming a mat in a forming line 1.2 meters wide using an apparatus similar to that shown in the figure. The strand flow rate was set at 45 kg/min representing the strands fed into the bin 11 and the mat conveyor 20 speed was 18.3 m/min. As shown in FIG. 1, five spike rolls 16 were provided and speeds of 110, 180 and 215 rpm were used for the spike rolls. The angle of slope of the spike roll axes was varied from 55 to 60 degrees to the horizontal, sloping back towards the rake back conveyor 15. Spacing between the spikes 17 on the spike rolls 16 was 20 cm and the spikes 17 on adjacent spike rolls 16 were intermeshing with six rows of spikes per row and an overlap of 7 cm. The diameter of each spike roll 16 was 40 cm and each spike 17 extended 10 cm from the surface of the roll. The spikes 17 were made from flat strips 2 cm wide. The spreader rolls 18 were according to the configuration shown in FIG. 4, tip to tip of the spikes 21 was 30 cm with the length of each spike 21 7 cm.

When the line had settled down and was running continuously, a sample collection board 1,220 mm long and 1,320 mm wide was placed on the mat conveyor 20 and run under the forming apparatus of the present invention. The collection board was divided into ten equal size compartments 610×264 mm for long strands (305 mm) and twenty equal size compartments 305×264 mm for shorter strands (152 mm). After each run the weight of wafers in each compartment was weighed to the nearest 0.1 of a gram. Four runs of the shorter strands and eight runs of the longer strands were measured for each test condition giving 80 individual sample weights per test condition.

In the first tests wood strands 305 mm long were run with the spreader rolls 18 having a separation of 38.1 and 49.5 cm gap between spikes 21. The spreader roll speed was 215 rpm. The spike rolls 16 rotated at 215 rpm also and had a spike roll axes slope angle of 60 degrees. The apron belt speed was 0.6 m/min. After each run the weight of wafers in each compartment was weighed to the nearest 0.1 of a gram. Eight runs were measured for each test condition of the long strands giving eighty individual sample weights per test condition. Table I shows the overall mat weight coefficient of variation for eighty measurements and the mean of five coefficients of variation calculated for each of five columns measured in direction of movement of mat belt 20.

TABLE I

| | | |
|---|---|---|
| Slope of Spike Roll Axes | 60 | 60 |

TABLE I-continued

| | | |
|---|---|---|
| to Horizontal, degrees | | |
| Spike Roll Speed, rpm | 215 | 215 |
| Spreader Roll Separation, cm | 38.1 | 49.5 |
| Mat Coefficient of Variation, % | | |
| Overall | 14.1 | 18.2 |
| Along Mat | 11.9 | 10.9 |

Similar tests were run with wood strands of 152 mm (6 inch) in length using a collection board with 20 equal compartments 305×264 mm in size. Results of the tests are shown in Table II.

TABLE II

| | | | | |
|---|---|---|---|---|
| Slope of Spike Roll Axes to Horizontal, degrees | 60 | 60 | 60 | 55 |
| Spike Roll Speed, rpm | 180 | 120 | 215 | 215 |
| Spreader Roll Separation, cm | 38.1 | 38.1 | 38.1 | 38.1 |
| Mat Coefficient of Variation, % | | | | |
| Overall | 18.7 | 12.6 | 11.5 | 14.8 |
| Along Mat | 13.3 | 8.4 | 9.4 | 11.2 |

Orientation tests were run with 76 mm grid spacing with the setup as shown in the figure. The grid was set at a height of 38 mm above the mat belt 20, measurements were taken after the line was running continuously with 152 mm long wood strands being formed into a mat. Mean wafer orientation angle obtained was 8.9 degrees and the orienting grid was able to handle the 45 kg/min flow rate of the wood strands in these tests. This orientation angle is considered to be a highly oriented product. Further tests were run with 152 mm grid spacing for wood strands 305 mm in length. The mean wafer orientation angle obtained was 9 degrees which is considered a highly oriented mat.

Various changes may be made to the apparatus shown without departing from the scope of the present invention which is limited only by the following claims.

The embodiments of the invention in which an exclusive property or privilege is claimed are defined as follows:

1. Apparatus for continuously laying wood strands in a mat of substantially even thickness, the mat advancing at a substantially constant speed comprising:

means for forming a pile of wood strands of substantially uniform depth, a plurality of spike rolls rotating about substantially horizontal parallel axes spaced vertically apart and located at one side of the pile of wood strands, the spike rolls adapted to pull wood strands out of the pile, and form a uniform curtain of falling strands, advancing means for the pile of wood strands to force the pile against the spike rolls, a pair of counter-rotating spreader rolls side by side in the same horizontall plane, the spreader rolls having axes substantially parallel to the spike roll axes and located beneath the spike rolls to receive the curtain of fallen strands, each of the spreader rolls having a plurality of radial extending spikes to distribute the strands evenly in a mat beneath, means for rotating the spreader rolls in counter-rotating directions such that strands distributed by the spikes are directed outside the spreader rolls and not in between, and horizontal adjustment means for the spreader rolls to adjust the location of the spreader rolls beneath the curtain of fallen strands, provide a predetermined distance between tips of the spikes on one spreader roll and tips of the spikes of the other spreader roll and insure that the tips of the spikes on one spreader roll do not overlap with the tips of the spikes on the other spreader roll.

2. The apparatus according to claim 1 wherein the spike rolls adjacent to each other have spikes which intermesh and overlap.

3. The apparatus according to claim 1 wherein the spike rolls adjacent to each other have spikes in line, and a space is provided between tips of the spikes on one spike roll and tips of the spikes on the adjacent spike roll.

4. The apparatus according to claim 1 including means for varying the speed of the counter-rotating spreader rolls.

5. The apparatus according to claim 1 wherein the spikes on the spike rolls and on the separating rolls are formed from flat strips, each of the spikes having a rectangular cross-section with a flat face attached to angle sections, extending axially along the face of the roll.

6. The apparatus according to claim 1 including means for varying the rotational speed of the spike rolls.

7. The apparatus according to claim 1 wherein the means for forming the pile of wood strands includes a rake back conveyor located at the top of the pile, to convey wood strands at the top of the pile away from the spike rolls and wherein the advancing means includes a conveyor at the bottom of the pile to advance the pile towards the spike rolls.

8. The apparatus according to claim 7 including means for varying the speed of the conveyor at the bottom of the pile.

9. The apparatus according to claim 7 wherein the plurality of spike rolls are located between the rake back conveyor at the top of the pile of wood strands and the conveyor at the bottom of the pile, the axes of the spike rolls are in a substantially straight line sloping upwards towards the rake back conveyor.

10. The apparatus according to claim 9 wherein the straight line slopes upwards at an angle in the range of about 55 to 60 degrees to the horizontal.

11. The apparatus according to any of claims 1, 2 or 3 including an orienting means located beneath the spreader rolls and above the mat, to provide an orientation of strands in the mat.

* * * * *